(12) United States Patent
Makkapati et al.

(10) Patent No.: US 7,646,328 B2
(45) Date of Patent: Jan. 12, 2010

(54) VERSATILE CONSTANT ALTITUDE PLAN POSITION INDICATOR FOR RADARS

(75) Inventors: Vishnu V. Makkapati, Ongole (IN); Pravas R. Mahapatra, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 216 days.

(21) Appl. No.: 11/235,047

(22) Filed: Sep. 26, 2005

(65) Prior Publication Data

US 2006/0202884 A1  Sep. 14, 2006

(30) Foreign Application Priority Data

Mar. 10, 2005  (IN) ............ 150/KOL/2005

(51) Int. Cl.
*G01S 13/95* (2006.01)
(52) U.S. Cl. .............. 342/26 R; 342/26 D; 342/179
(58) Field of Classification Search ........ 342/26 R
See application file for complete search history.

(56) References Cited

U.S. PATENT DOCUMENTS

| | | | |
|---|---|---|---|
| 3,769,442 A * | 10/1973 | Heartz et al. ........... | 345/443 |
| 4,002,827 A | 1/1977 | Nevin et al. | |
| 4,547,803 A | 10/1985 | Richards | |
| 4,697,185 A | 9/1987 | Thomas et al. | |
| 4,931,801 A | 6/1990 | Hancock | |
| 5,027,122 A * | 6/1991 | Wieler ................ | 342/26 D |
| 5,036,326 A | 7/1991 | Andrieu et al. | |
| 5,136,296 A | 8/1992 | Roettger et al. | |
| 5,379,215 A | 1/1995 | Kruhoeffer et al. | |
| 5,440,483 A * | 8/1995 | Badoche-Jacquet et al. ... | 702/3 |
| 5,519,401 A | 5/1996 | Farmer et al. | |
| 5,530,450 A | 6/1996 | Sohn et al. | |
| 5,554,992 A | 9/1996 | Toth et al. | |
| 5,583,972 A | 12/1996 | Miller | |
| 5,742,297 A | 4/1998 | Logan | |
| 6,018,307 A * | 1/2000 | Wakayama et al. ....... | 342/26 D |
| 6,064,388 A | 5/2000 | Reyzin | |
| 6,140,955 A | 10/2000 | Andrusiak et al. | |
| 6,211,814 B1 | 4/2001 | Benjamin et al. | |
| 6,240,369 B1 | 5/2001 | Foust | |
| 6,255,981 B1 | 7/2001 | Samaniego | |
| 6,272,433 B2 | 8/2001 | Baron et al. | |

(Continued)

FOREIGN PATENT DOCUMENTS

JP  54-43496  4/1979

OTHER PUBLICATIONS

Sugier, Jacqueline. "Common Software Library". EUMETNET OPERA Programme. Nov. 6, 2006. pp. 65-66.*

(Continued)

*Primary Examiner*—Thomas H Tarcza
*Assistant Examiner*—Matthew M Barker
(74) *Attorney, Agent, or Firm*—Schwegman, Lundberg & Woessner P.A.

(57) ABSTRACT

A method and a system to process radar volume scan data along an azimuth angle of a radar, to interpolate the radar volume scan data taken from adjacent elevation angles along the azimuth angle of the radar to obtain radar data corresponding to a predetermined altitude along the azimuth angle, and to display the radar volume scan data obtained corresponding to the predetermined altitude on a PPI display.

27 Claims, 7 Drawing Sheets

U.S. PATENT DOCUMENTS

| | | | |
|---|---|---|---|
| 6,307,500 B1 * | 10/2001 | Cornman et al. | 342/26 R |
| 6,405,134 B1 | 6/2002 | Smith et al. | |
| 6,415,046 B1 | 7/2002 | Kerut, Sr. | |
| 6,573,855 B1 | 6/2003 | Hayakawa et al. | |
| 6,721,678 B1 | 4/2004 | Zhang et al. | |
| 6,771,207 B1 | 8/2004 | Lang | |
| 6,985,837 B2 | 1/2006 | Moon et al. | |

OTHER PUBLICATIONS

Sugier, Jacqueline. "Common Software Library". EUMETNET OPERA Programme. Nov. 6, 2003. pp. 65-66.*

Doviak, R. J., et al., "Table of Contents", *Doppler Radar and Weather Observations*, 2nd Edition, San Diego, CA: Academic Press,(1993).

Mahapatra, P. R., et al., "Table of Contents", *Aviation Weather Surveillance System: Advanced Radar and Surface Sensors for Flight Safety and Air Traffic Management*, London, UK: IEE Press,(1999).

Watson, R., et al., "Combining ground based meteoriligical radar data from multiple overlapping sites", *Proc. International Geoscience and Remote Sensing Symposium*, 3, Italy,(Jul. 1995),1660-1662.

Zhang, J., et al., "Three-dimensional gridding and mosaic of reflectivities from the multiple wsr-88d radars" *Proc. 30th International Conference on Radar Meteorology*, Munich, Germany,(Jul. 2001),719-721.

U.S. Appl. No. 11/206,696, Amendment and Response filed Feb. 6, 2008 to Office Action mailed Nov. 6, 2007., 13.

"U.S. Appl. No. 11/206,696 Non-Final Office Action mailed Nov. 6, 2007", 14 Pages.

"Restriction Requirement Mailed Jul. 18, 2007 in U.S. Appl. No. 11/206,696", RERR,6 pgs.

"U.S. Appl. No. 11/206,696, Advisory Action mailed Nov. 17, 2008", 3 pgs.

"U.S. Appl. No. 11/206,696, Final Office Action mailed May 9, 2008", 9 pgs.

"U.S. Appl. No. 11/206,696, Final Office Action mailed Aug. 7, 2008", 9 pgs.

"U.S. Appl. No. 11/206,696, Preliminary Amendment mailed Oct. 31, 2008", 7 pgs.

"U.S. Appl. No. 11/206,696, Response filed Jul. 9, 2008 to final Office Action mailed May 9, 2008.", 13 pgs.

"U.S. Appl. No. 11/206,696, Response filed Aug. 17, 2007 to Restriction Requirement mailed Jul. 18, 2007", 10 pgs.

"U.S. Appl. No. 11/206,696, Response filed Oct. 7, 2008 to Final Office Action mailed Aug. 7, 2008", 10 pgs.

"U.S. Appl. No. 11/206,696 Final Office Action mailed Aug. 7, 2008", 12 pgs.

"U.S. Appl. No. 11/206,696, Non-Final Office Action mailed Dec. 22, 2008", 9 pgs.

"U.S. Appl. No. 11/206,696, Response filed Jun. 22, 2009 to Non Final Office Action mailed Dec. 22, 2008", 11 pgs.

Sugier, J., "Common Software Library", *EUMETNET OPERA Programme*, (Nov. 6, 2003), 65-66.

* cited by examiner

VERSATILE CONSTANT ALTITUDE PLAN POSITION INDICATOR FOR RADARS

CROSS REFERENCE TO RELATED APPLICATIONS

This application claims priority to India Patent Application No. 150/KOL/2005, filed Mar. 10, 2005, which is incorporated herein by reference.

BACKGROUND

Constant Altitude Plan Position Indicator (CAPPI) is a form of data presentation in weather radars. For CAPPI scanning, a horizontal slice is taken through the radar volume scan data at a constant altitude above the earth surface. The radar volume scan data is extracted from full 3-D scan data, and is converted to a 2-D format for presentation in polar coordinates on a computer display, paper printout, or any other two-dimensional surface.

CAPPI is a variant of the more general Plan Position Indicator (PPI) that displays weather parameters along radials from the radar as function of an azimuth scan angle. A radar antenna transmits and receives pulses at different elevation angles $\phi$ and at different azimuth angles $\theta$ by both performing a rotating scan operation in the azimuth and by varying the elevation angle. PPI data is generated and recorded by scanning a beam circularly at a constant elevation angle. A volume scan consists of multiple constant-elevation azimuth scans. PPI volume scan data at multiple elevation angles is used to produce CAPPI.

Near the radar site there is often ground clutter, which may interfere with obtaining a clean display of weather. In the beam position(s) with low elevation angle(s), clutter is often so strong that filtering the ground clutter also removes weather signals resulting in gaps in the weather display.

In PPI scanning, the radar beam may overshoot precipitation altitudes, for a part of the radial, and thereby not detect any precipitation at the corresponding ranges (i.e. distances from the radar).

Weather radar systems often deliberately degrade the time resolution for observation in order to improve signal quality and also to reduce the data handling specifications over long observation periods. The PPI volume scanning mode also degrades the spatial resolution by skipping certain elevation angles to reduce the time for scanning the region around the radar.

The maximum elevation of scan may be limited to a value less than 90° (i.e. vertical pointing), leaving a conical 'blind zone' over the radar location. This causes a circular hole to appear in the CAPPI, the hole being larger at higher altitudes.

DETAILED DESCRIPTION

Figure 1:
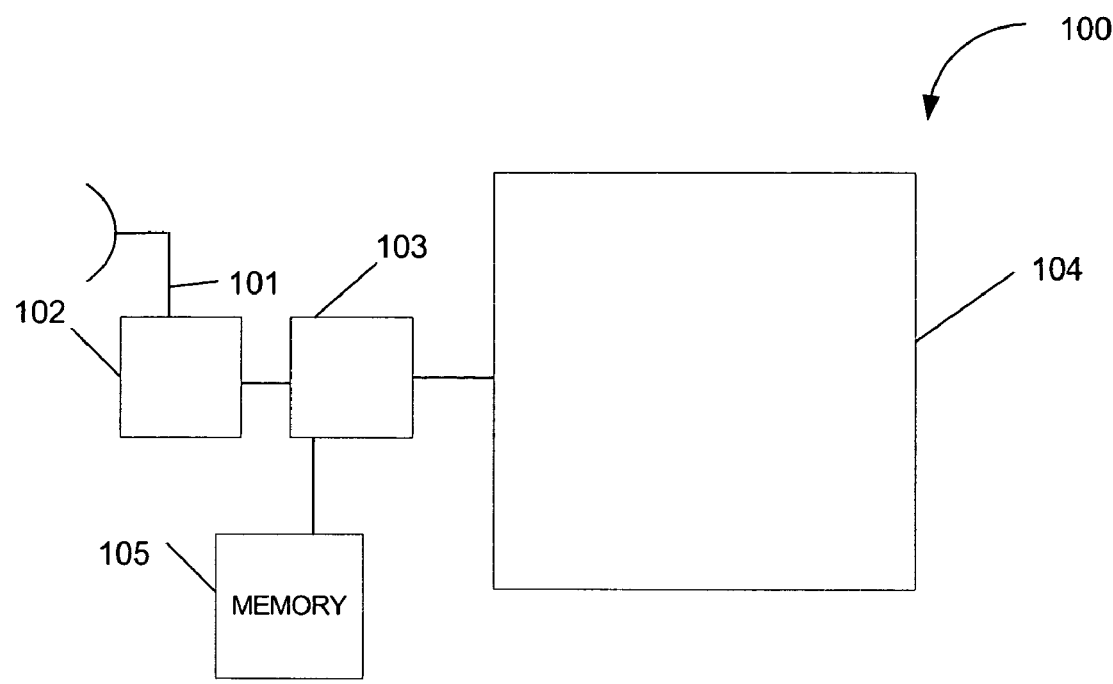
FIG. 1 illustrates a schematic radar system according to an example embodiment.

FIG. 1 illustrates a schematic radar system 100 according to an example embodiment. The radar system 100 includes an antenna 101 coupled to a radar receiver 102, a processor 103 coupled to the radar receiver 102, and a Plan Position Indicator (PPI) display 104 coupled with the processor 103. The processor 103 receives volume scan spherical coordinate data from the radar receiver 102, converts the radar data to rectangular coordinate data, and provides the rectangular coordinate data to the display 104. Additionally or alternatively, the processor 103 may receive the volume scan data recorded from a previous scan in a computer memory 105.

Figure 2:
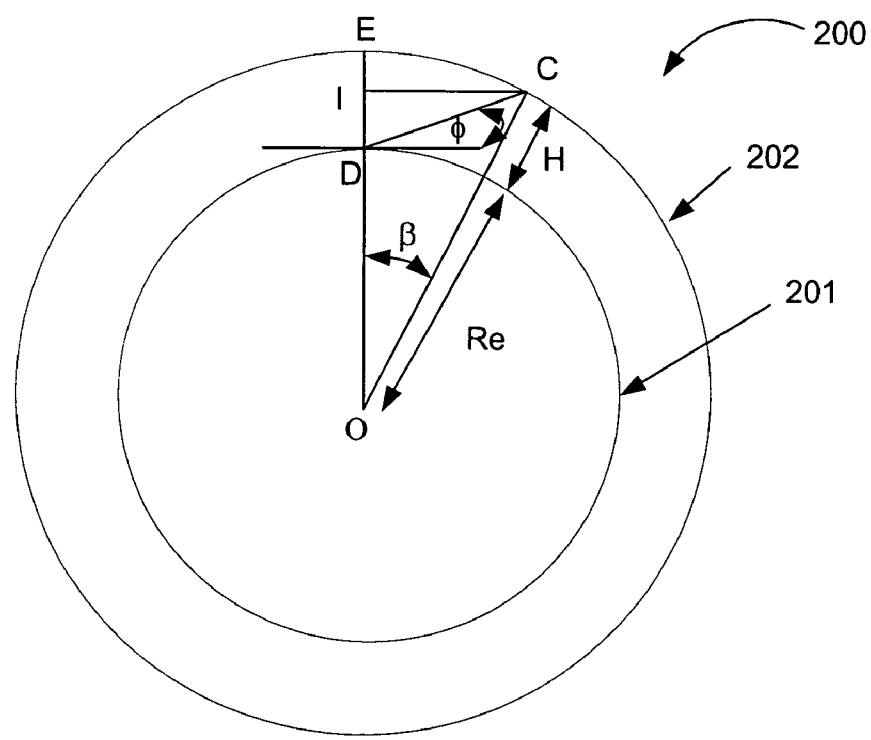
FIG. 2 illustrates a schematic cross-section of Earth and a surface at a constant altitude above the earth's surface at which Constant Altitude Plan Position Indicator (CAPPI) data is generated according to an example embodiment.

FIG. 2 illustrates a schematic cross-section 200 of Earth 201 and a surface 202 having a constant altitude H above the earth's surface at which Constant Altitude Plan Position Indicator (CAPPI) data is generated according to an example embodiment. An origin of the radar antenna 101 is represented at point D on the earth's surface. The center of the Earth is represented by O. The Earth's radius is represented by $R_e$. Point C represents the point at which the CAPPI data may be generated at the altitude H. The angle at the earth's center between point D and point C is represented by $\beta$. The point E is directly above point D at the altitude H.

An elevation angle $\phi$ represents the angle at point D between the earth's surface (i.e. a tangent to the Earth's surface at point D) and the line CD. The specific elevation angle $\phi$ may have been skipped during the radar scan operation. In an example embodiment, gaps such as this may be filled using an interpolation scheme to potentially provide spatially continuous information of weather at the given altitude H. The elevation angle $\phi$ of the radar is computed for each increment in EC using equation set (2) and FIG. 2.

$$\beta = \frac{EC}{R_e + H} \quad (2)$$

$$CI = (R_e + H)\sin(\beta)$$

$$OI = (R_e + H)\cos(\beta)$$

$$ID = (R_e + H)\cos(\beta) - R_e$$

$$CD = \sqrt{CI^2 + ID^2}$$

$$\phi = \tan^{-1}\left(\frac{ID}{CI}\right)$$

Because the Earth is curved and the scan elevation interval may be between a minimum value and a maximum value, a point such as point C in FIG. 2 on the CAPPI surface may have an elevation angle $\phi$ outside the scanned elevation interval (or in between two scanned elevation angles). For altitudes on the CAPPI surface that are below the minimum scan elevation, the data may be taken from the lowest elevation angle available. Conversely, if a selected point C is above the maximum scan elevation, the data may be taken from the highest elevation angle available.

Embodiments may account for bending of the radar beam. The radar beam may bend as it passes through layers of air with different refractive indices. Under standard atmospheric conditions, the bending of the radar beam has a radius of curvature about four times the radius of the Earth. Thus, under normal conditions, a radar beam emitted horizontally and at other elevations would take paths that curve slightly below straight line paths.

Figure 3:
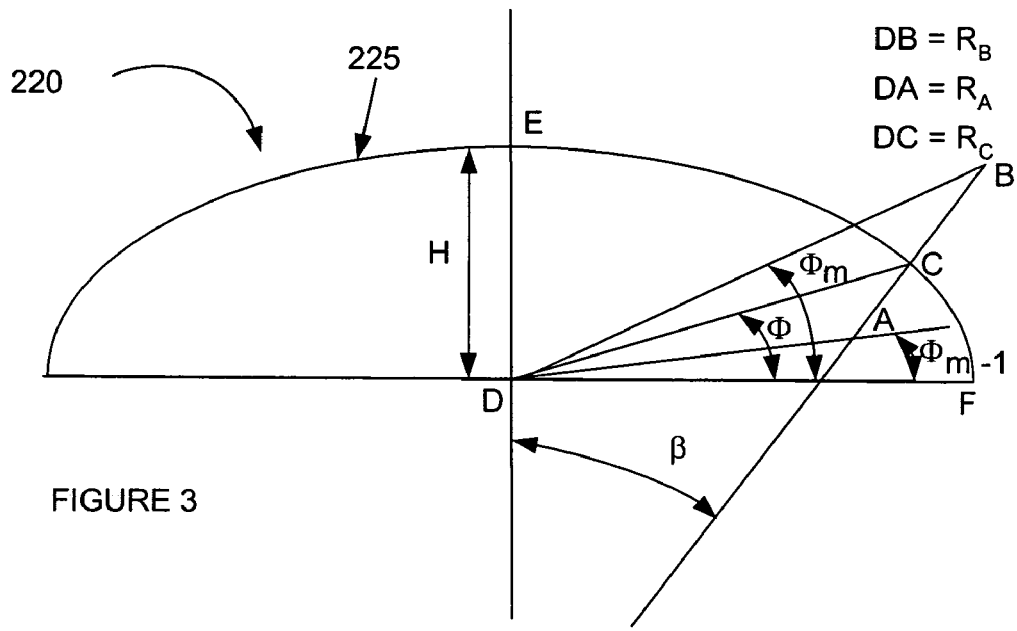
FIG. 3 illustrates a schematic partial cross-section of CAPPI geometry in a vertical section above a plane tangent to the Earth at the radar location, as employed in an example embodiment.

FIG. 3 illustrates a schematic partial cross-section of CAPPI geometry 220 in a vertical section above a plane tangent to the Earth at the radar location D, as employed in an example embodiment. The horizontal line through D is the tangent to the Earth's surface at point D and the arc 225 represents the spherical surface, at a height H above the radar location D, at which Constant Altitude Plan Position Indicator (CAPPI) data is generated according to an additional example embodiment.

In a volume scanning mode, an elevation angle $\phi$ of the antenna 101 is changed incrementally by a determined angle and a horizontally rotating scanning operation is performed along each incremented elevation angle. CAPPI data for point C may not be readily available in the volume scan data, and may be constructed from radar data gathered along other elevation angles and/or azimuth angles, in embodiments of the present invention. The CAPPI data at point C may be generated by interpolating the gathered radar data in elevation. Elevation angles $\phi_m$ and $\phi_{m-1}$ denote the elevation angles of the radar scan that are closest to angle $\phi$, on either side, as shown in FIG. 3. The weather parameter (e.g. reflectivity Z) at the point C, having elevation 4, may be calculated as the weighted average of radar resolution cell data from points A and B, having elevations $\phi_{m-1}$ and $\phi_m$, respectively, in an embodiment.

In FIG. 3, the distance from point D to point B (DB) may be represented as $R_B$, the distance from point D to point A (DA) may be represented as $R_A$, and the distance from point D to point C (CD) may be represented as $R_C$. Each of the range lines DB and DA include curves representing bent propagation paths between the radar and the points B and A, respectively.

In embodiments, the CAPPI construction includes two processes. The first process includes a mechanism to generate CAPPI scan line data of a weather parameter Z. For a specified CAPPI altitude, the two bounding radials $\phi_{m-1}$ and $\phi_m$ (i.e. the value of m), the interpolation weight between them, and the ranges CD, DB and DA depend on the length of the arc EC alone, and are independent of the azimuth angle $\theta$.

In the example embodiments, the CAPPI scan line data is generated by keeping EC constant and varying the azimuth angle $\theta$ of the radar from 0 to $2\pi$ (or a certain $\theta_{min}$ to $\theta_{max}$ for a sectoral CAPPI) clockwise or counter-clockwise depending on the direction of the radar scan. As discussed in more detail with regard to the process of FIGS. 6A, 6B, 6C, after completing the circular arc at a constant arc length EC, the arc length EC may be incremented by 1 km (or any other determined step, increment or unit) and the azimuth angle $\theta$ may varied again from 0 to $2\pi$ (or $\theta_{min}$ to $\theta_{max}$).

In the second step of the CAPPI construction, the CAPPI scan line data is presented to the PPI coordinate conversion, formatting and display mechanism.

Figure 4:
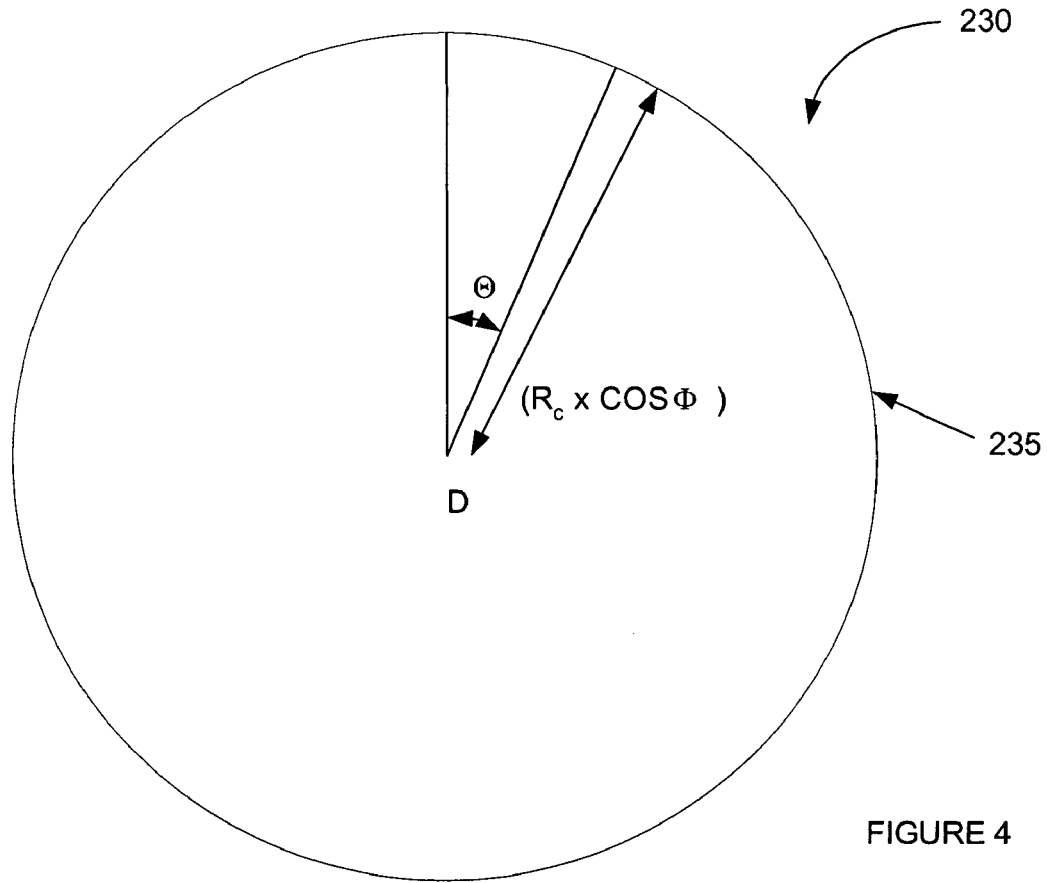
FIG. 4 illustrates a schematic plan view of an area around the radar showing a constant-range circle over which CAPPI data is generated according to an example embodiment.

FIG. 4 illustrates a schematic plan view 230 of an area around the radar showing a horizontal projection of a constant-range circle 235 over which CAPPI data is generated according to an example embodiment. The circle 235 includes a radius of $(R_c)(\cos\phi)$. This radius is the horizontal component of the range shown as the line segment CD in FIG. 3. The CAPPI scan data may display weather conditions occurring over any given constant-height surface within a half-spherical observation volume of the radar. The CAPPI data may be generated about the radar origin D over azimuth angle $\theta$ from $0° \leq \theta \leq 360°$. The azimuth angle $\theta$ may be incremented by 1° or by any other angular increment as specified in the radar data in the CAPPI generation.

Figure 5:
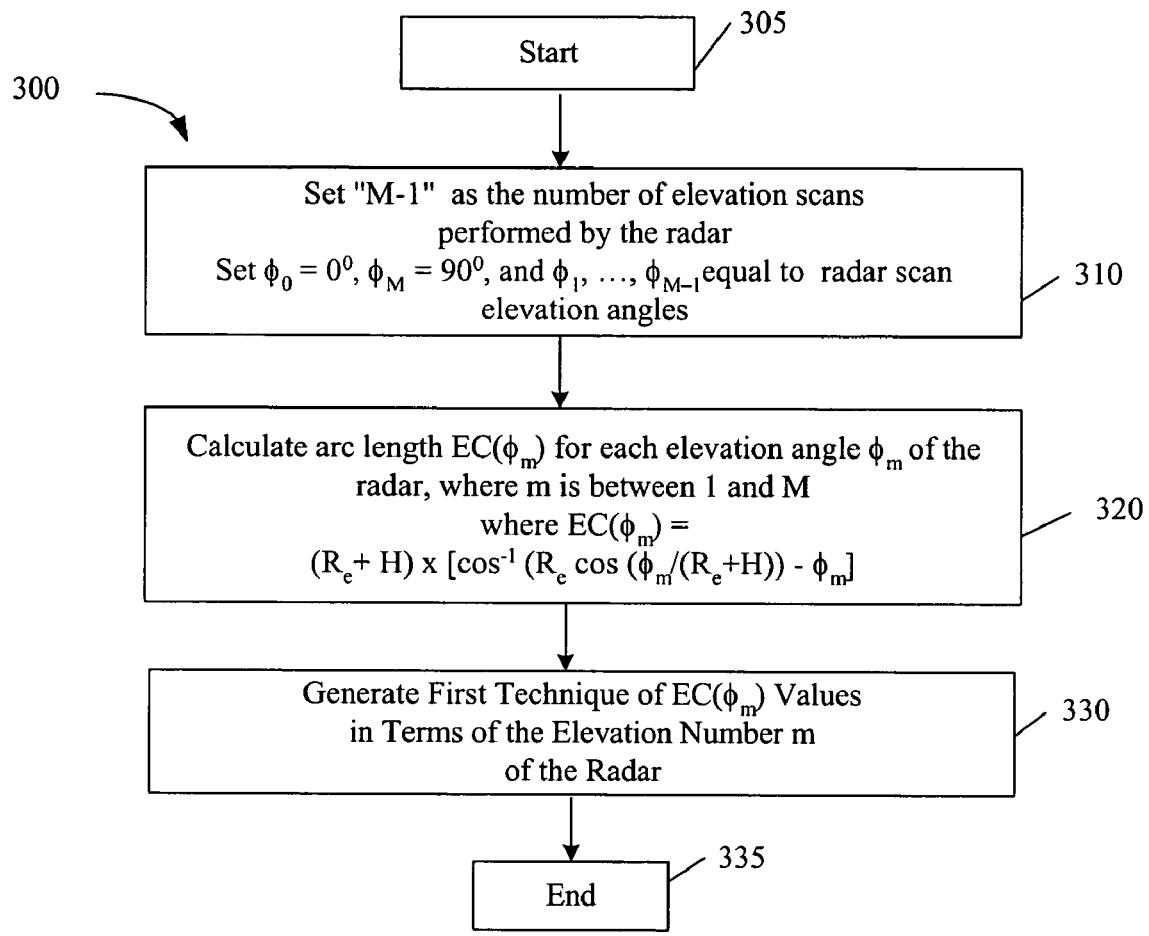
FIG. 5 illustrates a process of generating a mechanism, such as look up tables, according to an example embodiment.

FIG. 5 illustrates a process 300 of generating a mechanism, such as look up tables, according to an example embodiment. The process 300 includes the first of the two processes discussed with regard to FIG. 3.

At block 305 of FIG. 5, the process begins. At block 310, a value of M is selected such that M−1 equals the number of elevation scans performed by the radar 102. In embodiments of the process, set $\phi_0$ equal to zero, set $\phi_M$ equal to 90°, and the angles be through $\phi_{M-1}$ equal respectively to the radar scan elevation angles from the lowest to the highest along the determined increments.

At block 320, an arc length EC ($\phi_m$) may be calculated for each elevation angle $\phi_m$ of the radar. The interval for the elevation number m may be: $0 \leq m \leq M$. The elevation number m may be incremented, by 1, for example, in the interval. The arc length EC may be calculated for each elevation angle $\phi_m$ with the formula: $EC(\phi_m)=(R_e+H)\times[\cos^{-1}(R_e \cos(\phi m)/(R_e+H))-\phi_m]$.

At block 330, a first mechanism of EC($\phi_m$) values in terms of the elevation number m of the radar may be generated using the values generated at block 320. The first mechanism may be a look up table indexed by elevation number m and/or elevation angle $\phi_m$, a graph, an algorithm, a chart, and/or any other possible mechanism.

At block 335, the process of generating the first mechanism ends.

Figure 6A:
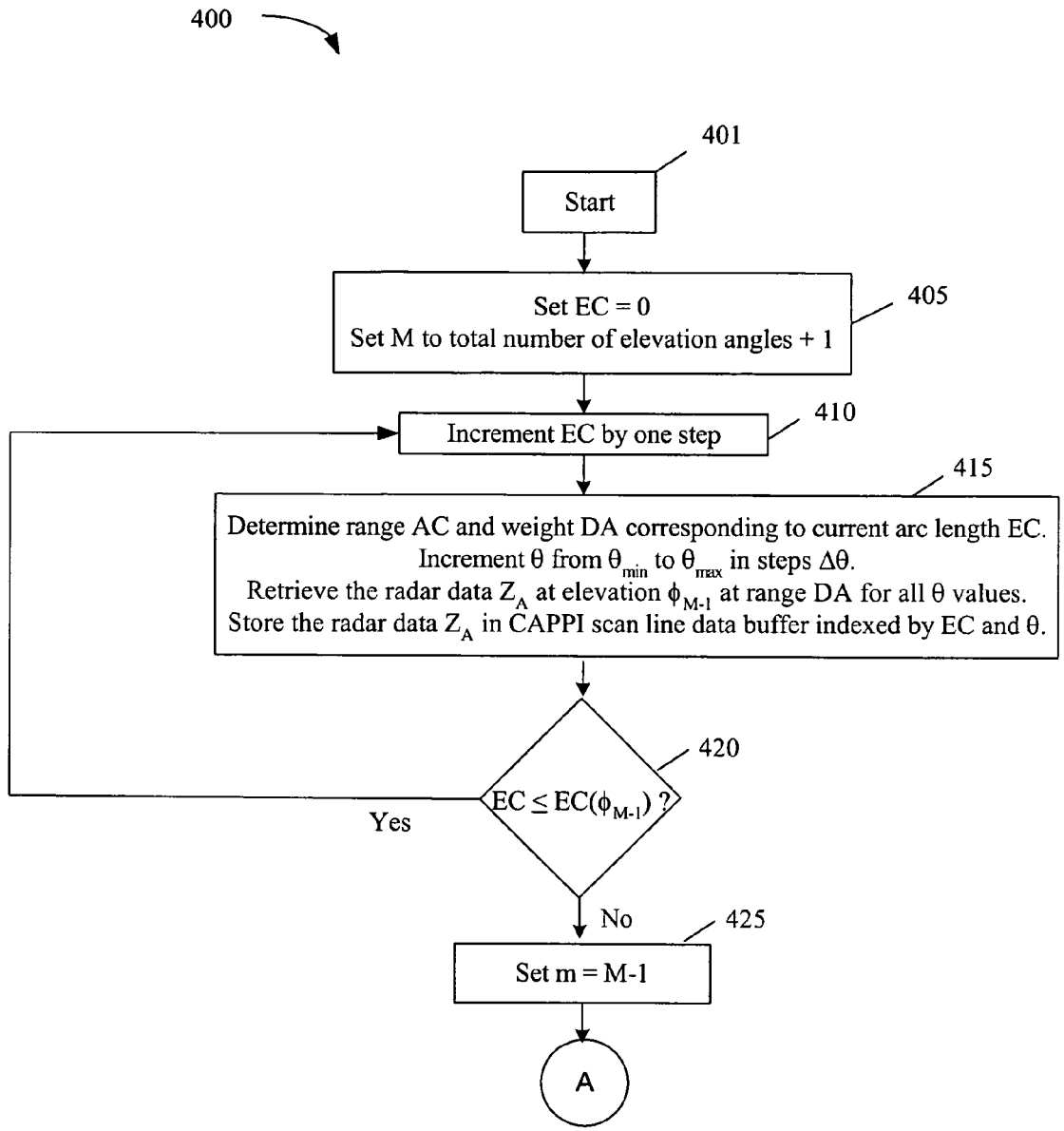
FIGS. 6A, 6B, and 6C illustrate a process of generating CAPPI data using the mechanisms generated in FIG. 5 according to an example embodiment.
Figure 6B:
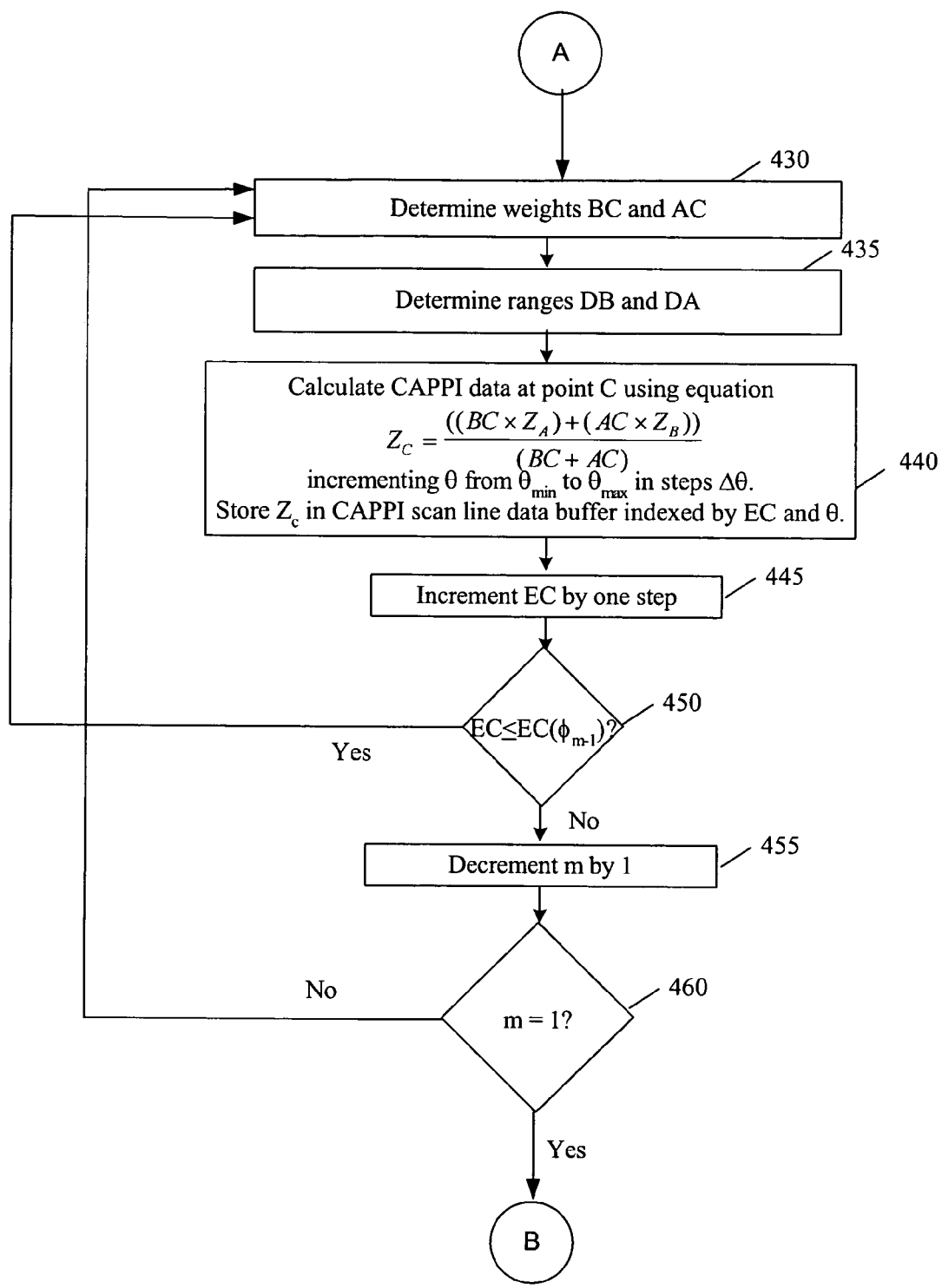
Figure 6C:
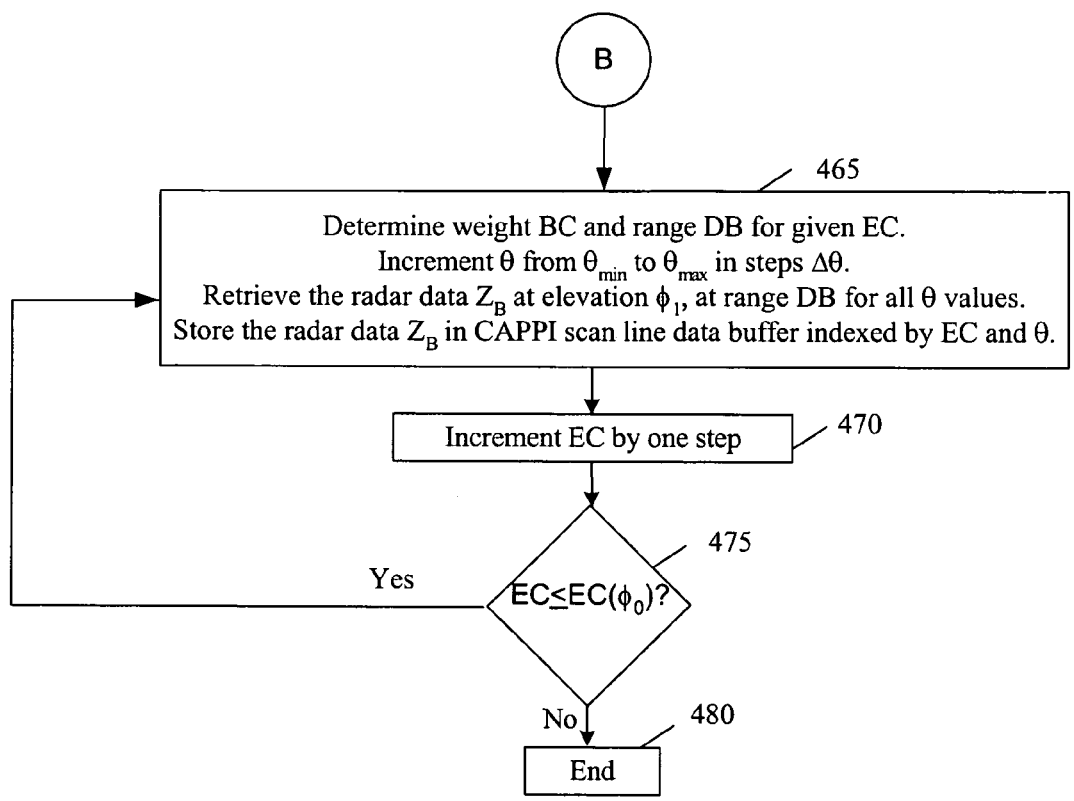

FIGS. 6A, 6B, and 6C illustrate a process 400 of generating CAPPI data using the mechanisms generated in FIG. 5 according to an example embodiment.

At block 401, the process 400 of FIG. 6A begins.

At block 405, the process 400 sets the value of the arc length EC, illustrated in FIG. 3, to zero. The value of M is set to one more than the number of total scan elevation angles $\phi$ in the radar volume scan data set.

At block 410, the length EC is incremented by one step, which may be one (1) km or any other chosen value.

At block 415, the range CD and the corresponding angle $\phi$ may be calculated using equation (2). The range AC may be calculated using the equation: $AC=CD\times\sin(\phi-\phi_{M-1})/(\cos(\phi_{M-1}+\beta)$. The range DA may be calculated by solving for DA in the equation:

$$\frac{1}{17000}(DA)^2\cos^2(\phi_{M-1}) + (DA)\sin(\phi_{M-1}) = H - (AC).$$

Optionally, for a given radar and scan cycle, instead of calculating the range DA, the values of range DA may be read from a pre-stored mechanism, such as a pre-stored look-up table LUTR, of range DA indexed by arc length EC. The pre-stored mechanism may be from a previous computation of the range DA for the same CAPPI altitude.

The azimuth angle $\theta$ may be incremented from $\theta_{min}$ to $\theta_{max}$ in steps of $\Delta\theta$, where $\Delta\theta$ may be any degree, such as 1 degree. The radar data $Z_A$ may be retrieved at range DA, from the original scan data at elevation $\phi_{M-1}$, for all $\theta$ values. The radar data $Z_A$ may be stored in a CAPPI scan line data buffer indexed by arc length EC and azimuth angle $\theta$.

At block 420, the process 400 is queried as to whether EC is less than or equal to $EC(\phi_{M-1})$. If the answer to the query is 'yes' then the process may proceed to block 410. If the answer to the query is 'no', then the process may proceed to block 425.

At block 425, m may be initialized to M−1 and the process may proceed to block 430 in FIG. 6B.

At block 430, the weights BC and AC may be calculated using the equations $BC=CD\times\sin(\phi_m-\phi)/(\cos(\phi_m+\beta)$ and $AC=CD\times\sin(\phi-\phi_{m-1})/(\cos(\phi_{m-1}+\beta)$, where CD and $\phi$ are obtained using equation (2). Optionally, for a given radar and scan cycle, the values of weights BC and AC may be read from a pre-stored mechanism, such as a pre-stored look-up table LUTW, from a previous computation of BC and AC for the same CAPPI altitude.

At block 435, determine ranges DB and DA solving for DB and DA in the equations:

$$\frac{1}{17000}(DB)^2\cos^2(\phi_m) + (DB)\sin(\phi_m) = H + (BC)$$

and $$\frac{1}{17000}(DA)^2\cos^2(\phi_{m-1}) + (DA)\sin(\phi_{m-1}) = H - (AC),$$

respectively. Optionally, for a given radar and scan cycle, the values of ranges DB and DA may be read from a pre-stored mechanism, such as the look-up table LUTR indexed by arc length EC, from a previous computation of ranges DB and DA for the same CAPPI altitude.

At block 440, CAPPI data is calculated at point C. Weather data $Z_A$ may be retrieved from the radar volume scan data for elevation $\phi_{m-1}$ and range DA. Weather data $Z_B$ may be retrieved for elevation $\phi_m$ and range DB from the radar volume scan data. The weather data $Z_C$ at CAPPI data point C is the interpolation of $Z_A$ and $Z_B$ with weights BC and AC, and may be calculated according to the equation $$Z_C = \frac{((BC \times Z_A) + (AC \times Z_B))}{(BC + AC)}.$$

At block 445, the length EC is incremented by one step.

At block 450, the process is queried as to whether EC is less than or equal to $EC(\phi_{m-1})$. If the answer to the query is 'yes' then the process may proceed to block 430. If the answer to the query is 'no', then the process may proceed to block 455.

At block 455, m is decremented by 1.

At block 460, the process is queried as to whether m is equal to 1. If the answer to the query is 'no' then the process may proceed to block 430. If the answer to the query is 'yes', then the process proceeds to block 465. The process may proceed to block 465 in FIG. 6C.

At block 465, for a given arc length EC, calculate weight BC using the equation $BC=CD\times\sin(\phi_1-\phi)/(\cos(\phi_1+\beta)$, then solve for range DB using the equation:

$$\frac{1}{17000}(DB)^2\cos^2(\phi_1) + (DB)\sin(\phi_1) = H + (BC).$$

Angle $\theta$ may be incremented from $\theta_{min}$ to $\theta_{max}$ in steps of $\Delta\theta$. The radar data $Z_B$ at range DB may be retrieved from the scan data at elevation $\phi_1$, for all $\theta$ values. The radar data $Z_B$ may be stored in CAPPI scan line data buffer indexed by length EC and angle $\theta$. Optionally, for a given radar and scan cycle, the values of DB may be read from the pre-stored mechanism, such as the pre-stored look-up table LUTR indexed by EC, from a previous computation of range DB for the same CAPPI altitude.

At block 470, the length EC is incremented by one step.

At block 475, the process is queried as to whether EC is less than or equal to $EC(\phi_0)$ at $\phi_0=0°$. If the answer to the query is 'yes' then the process proceeds to block 465. If the answer to the query is 'no', then the process proceeds to block 480.

At block 480, CAPPI scan line data generation ends.

At block 485, PPI display scan conversion occurs, as described herein. PPI scan converted CAPPI scan line data may be obtained and stored.

At block 490, the generated CAPPI radar data $Z_c$ along the surface 202 at the altitude H above the earth's surface may be displayed on the display 104 and/or printed.

Figure 7:
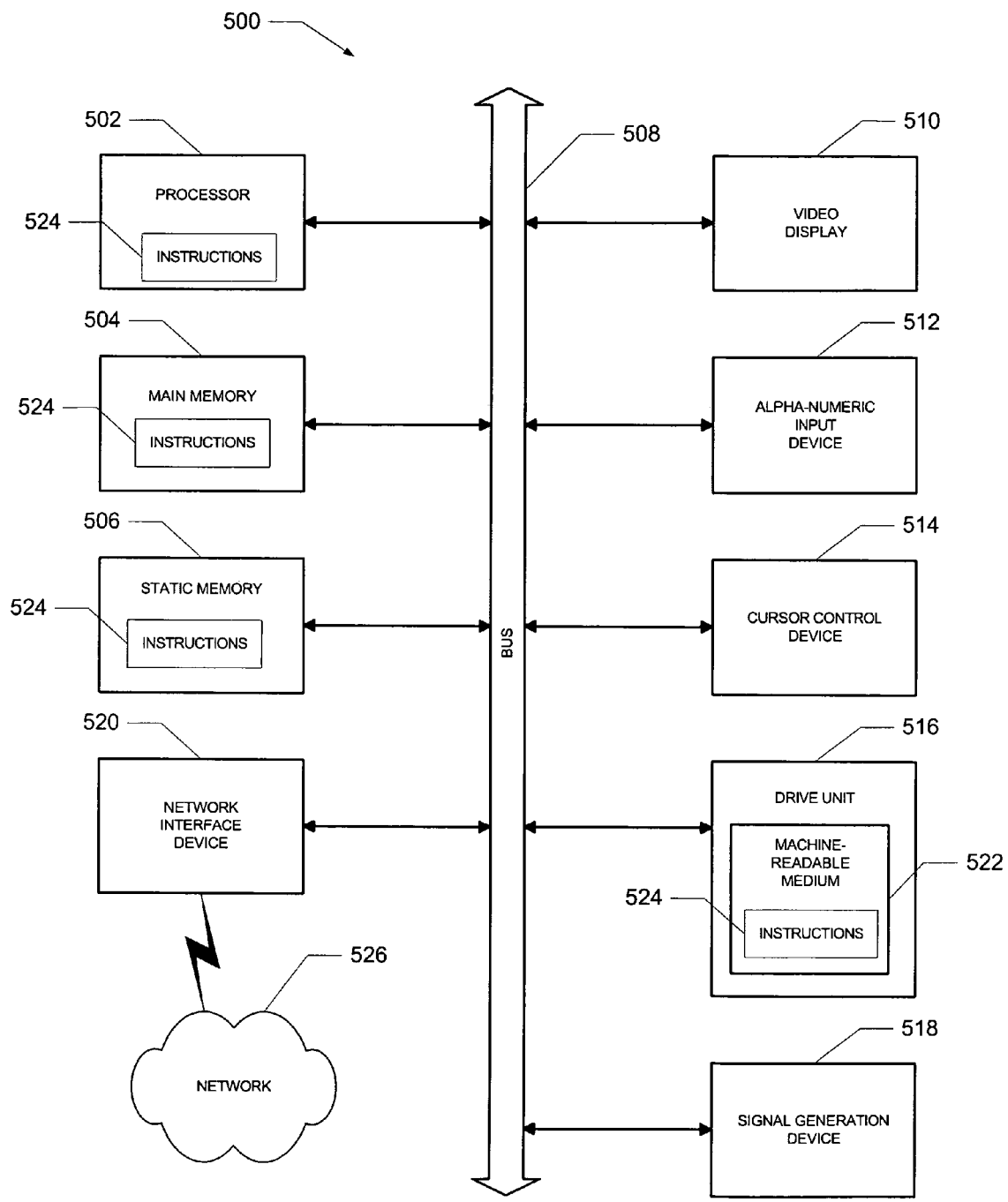
FIG. 7 shows a diagrammatic representation of a machine in the form of a computer system within which a set of instructions, for causing the machine to perform any one or more of the methodologies discussed herein, may be executed, according to an example embodiment.

FIG. 7 illustrates a diagrammatic representation of a machine in the example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a mobile device, a palmtop computer, a laptop computer, a desktop computer, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 500 includes the processor 103/502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The instructions 524 may also reside, completely or at least partially, within the main memory 504, the static memory 506, and/or within the processor 502 during execution thereof by the computer system 500. The main memory 504 and the processor 103/502 also may constitute machine-readable media. In an additional embodiment, the mechanism (such as the look up table) is not stored, but rather a processor or additional processor is used to generate the weights substantially in real-time. This additional embodiment may be useful, e.g. where processing speed is more readily available as compared with memory.

The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The instructions 524 may further be transmitted or received over a network 526 via the network interface device 520.

Embodiments may be utilized by running the program on a digital computer that receives data from a radar receiver to generate a CAPPI display on the monitor in quasi-real-time. Embodiments are also useful for generating CAPPI display from pre-recorded radar data available from public or private data archives. The display unit 510 may be of any resolution and embodiments may be implemented without addition of any special hardware to a computer.

The mechanism(s) may also be implemented on a Digital Signal Processing (DSP) chip or any other computer board. The mechanism(s) is(are) implemented in a high level programming language for ease of coding, though they may also be implemented in other types of programming languages, e.g. in assembly or machine languages to achieve higher processing speed and reduced memory overheads. Due to the versatile nature of the mechanism, the technique may be embedded in hardware for CAPPI display of data from radar receiver during real-time operation.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Using the embodiments of methods and systems described herein, a horizontal slice is taken through the radar volume scan data at constant altitude above the earth surface using Constant Altitude Plan Position Indicator (CAPPI). Weather radar systems often deteriorate the spatial sampling of the scan volume by skipping certain elevation angles to reduce time used for scanning the region around the radar. This results in gaps in the CAPPI data, which have been filled in the embodiment using an interpolation scheme. Other CAPPI schemes may utilize a nearest neighbor approach, which may introduce artifacts into the display, including sharp jumps or boundaries between annular segments of the display. Embodiments determine the display parameter at the CAPPI surface by making a weighted interpolation of data from adjacent scan elevations to obtain a smoother and more accurate CAPPI display. The CAPPI scan line data constructed along each azimuth angle may be scan converted to computer display coordinates.

In systems described herein, the elevation from the ground of the CAPPI surface may be first specified, and CAPPI data for increments in EC between the vertical and the highest elevation angle of radar is taken from the radar volume scan data for the highest elevation angle. The CAPPI data for increments in EC between the lowest elevation angle and 0° (i.e. horizontal) is taken from the radar volume scan data for the lowest elevation angle. The length of the arc EC for each elevation angle is computed. These pre-computed arc lengths may be used for determining the adjacent elevation angles corresponding to each increment in EC; the scheme may avoid computation of adjacent elevation angles for each increment in EC. Further, interpolation may add little overhead due to calculation of weights and weighted average of weather data from adjacent elevation angles.

In embodiments described herein, a mechanism, such as a graph, a look-up table (LUT), a set of equations, and/or an algorithm may be used for calculating or storing the arc lengths EC for each radar beam elevation angle $\phi$, and weights and ranges for each increment in EC for a given altitude H from ground. For ease of explanation, the mechanism is a look up table (LUT) in these embodiments. The LUT for ranges and weights (i.e. the second and third mechanisms) is implemented as one dimensional arrays indexed by the number of the increments in EC from the vertical, while the LUT for lengths of EC for each elevation angle is indexed by the elevation number. The LUT can be computed with minimal processing overhead and can be accessed quickly. The technique may be efficient because the memory used for storing the LUTs may be minimal and an efficient calculation of the lengths may add less processing overhead. This technique may not recompute the LUT unless the altitude or the elevation angles of the radar data change. Since the elevation angles of the radar data are less likely to change, multiple LUTs may be computed and stored for different altitudes. The use of LUTs enables high performance with minimal memory overhead and memory may be less expensive as compared to the increase of the processing speed of hardware. It also enables the CAPPI data computation to be carried on processors of lower capability such as those in airborne computers.

CAPPI may avoid issues associated with PPI by picking constant altitude data from different elevation scans. However, because CAPPI includes data from all elevation scans in the radar volume, processing in some embodiments may take considerably longer than PPI displays.

As described herein, the CAPPI data generation process described in FIGS. 6A, 6B, and 6C is compatible with any PPI display algorithm or device that may handle any user-specified rotation, zooming, magnification, distance interval, and sector selection. This scheme may provide additional features for displaying CAPPI. The CAPPI data generated using these embodiments are indexed by the horizontal distance (along constant-height arc) from the vertical through the radar, and the azimuth angle, and may be converted to any other coordinate systems, e.g. latitude-longitude, Cartesian. Embodiments are suitable for generating CAPPI data for use with techniques superposing CAPPI data from overlapping radars, where the radar data should be converted from the individual radar coordinates to a universal grid system. CAPPI, generated using this interpolation scheme, suits viewing specifications and may be more accurate and continuous than data generated using a nearest neighbor scheme.

Embodiments described herein may be used with the presentation and display of weather radar data by users such as meteorologists, air traffic controllers, pilots, TV weather broadcasters, and disaster monitors. Embodiments can be licensed to companies working on general radars, weather radars, imaging radars, meteorological data products and PPI displays.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. § 1.74 (b) to allow the reader to quickly ascertain the nature and gist of the technical disclosure. The Abstract is submitted with the understanding that it will not be used to interpret or limit the scope or meaning of the claims.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures are merely representational and may not be drawn to scale. Certain proportions thereof may be exaggerated, while others may be minimized. Accordingly, the specification and drawings are to be regarded in an illustrative rather than a restrictive sense.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment. One skilled in the art will recognize that other configurations are available and other methods of manufacture may function as well without exceeding the scope of the disclosed subject matter.

While particular embodiments have been illustrated and described, they are merely examples and a person skilled in the art may make variations and modifications to the embodiments described herein without departing from the spirit and scope of the presently disclosed subject matter.

The invention claimed is:

1. A method to display weather radar data in a Constant Altitude Plan Position Indicator (CAPPI) system comprising:
   processing radar volume scan data along an azimuth angle of a radar;
   interpolating the radar volume scan data taken from adjacent elevation angles along the azimuth angle of the radar and in a local vertical direction that is orthogonal to a CAPPI surface to obtain weather radar data corresponding to a predetermined altitude along the azimuth angle; and
   displaying the weather radar data obtained corresponding to the predetermined altitude on a two-dimensional display.

2. The method of claim 1 further comprising processing the radar volume scan data along a plurality of azimuth angles to obtain radar Constant Altitude Plan Position Indicator (CAPPI) scan line data corresponding to the predetermined altitude.

3. The method of claim 2 further comprising processing the radar volume scan data along one of the plurality of azimuth angles from a minimum azimuth angle to a maximum azimuth angle to obtain the radar CAPPI scan line data corresponding to the predetermined altitude.

4. The method of claim 2 further comprising generating CAPPI scan line data over a predetermined distance interval from the radar.

5. The method of claim 1 further comprising determining a distance, along a constant altitude surface associated with the predetermined altitude, between an intersection of a vertical at the location of the radar with the constant altitude surface and an intersection of a line of predetermined elevation from the radar with the constant altitude surface.

6. The method of claim 5 further comprising determining two adjacent elevation angles in a radar volume scan data set for any given point on the constant-altitude surface.

7. The method of claim 6 further comprising determining weights for averaging data from the adjacent elevation angles based on the distance along the vertical.

8. The method of claim 7 further comprising calculating the weights and corresponding ranges at the predetermined altitude using at least one of a graph, a chart, a table, an algorithm, and a set of equations.

9. The method of claim 1 wherein interpolating includes using a weighted average interpolation mechanism, wherein the mechanism includes at least one of a graph, a chart, a table, an algorithm and a set of equations.

10. A computer-readable medium having program instructions to perform a method to display weather radar data in a Constant Altitude Plan Position Indicator (CAPPI) system, the method comprising:
    processing radar volume scan data along an azimuth angle of a radar;
    interpolating the radar volume scan data taken from adjacent elevation angles along the azimuth angle of the radar and in a local vertical direction that is orthogonal to a CAPPI surface to obtain weather radar data corresponding to a predetermined altitude along the aximuth angle; and
    displaying the weather radar data obtained correspondence to the predetermined altitude on a two-dimensional display.

11. A process of generating CAPPI data at a point C having an altitude H along an azimuth angle θ, the process comprising:
    using a computer processor for calculating arc length $EC(\phi_m)$ for each elevation angle $\phi_m$ of a radar using $EC(\phi_m)=(R_e+H)\times[\cos^{-1}(R_e\cos(\phi_m)/(R_e+H))-\phi_m]$, where m includes an elevation number, where $0 \leq m < M$, where M−1 includes a number of elevation scans performed by the radar, where $R_e$ includes the radius of the earth, and H includes the altitude at which CAPPI data is to be generated;
    using the computer processor for generating a first technique of $EC(\phi_m)$ values indexed by a group selected from the elevation number m and the elevation angle $\phi_m$ of the radar;
    using the computer processor for determining the elevation angle φ for arc length EC at each determined increment along the arc EC from $EC(\phi_M)$ to $EC(\phi_0)$ using $\phi=\tan^{-1}[((R_e+H)\cos(\beta)-R_e)/((R_e+H)\sin(\beta))]$, where $\beta=(EC)/(R_e+H)$;
    using the computer processor for determining, at each incremented arc length EC in an interval $0<EC<EC(\phi_{M-1})$, a weight AC using weight $AC=CD\times\sin(\phi-\phi_{M-1})/(\cos(\phi_{M-1}+\beta))$, where $CD=\sqrt{[(R_e+H)\sin(\beta)]^2+[(R_e+H)\cos(\beta)-R_e]^2}$, and calculating a range line DA for the domain $[0: EC(\phi_{M-1})]$ by solving equation $$\frac{1}{17000}(DA)^2\cos^2(\phi_{M-1}) + (DA)\sin(\phi_{M-1}) = H - (AC);$$

using the computer processor for determining, at each incremented arc length EC in an interval $EC(\phi_{M-1})<EC<EC(\phi_1)$, weights BC and AC, respectively corresponding to elevation angles $\phi_m$ and $\phi_{m-1}$ adjacent to elevation angle $\phi$, where weight $BC=CD \times \sin(\phi_m-\phi)/(\cos(\phi_m+\beta))$ and weight $AC=CD \times \sin(\phi-\phi_{m-1})/(\cos(\phi_{m-1}+\beta))$, calculating a range DB for the domain $[EC(\phi_{M-1}): EC(\phi_1)]$ from the radar to a point B vertically above the point C along the azimuth angle $\theta$ by solving equation $$\frac{1}{17000}(DB)^2\cos^2(\phi_m) + (DB)\sin(\phi_m) = H + (BC),$$

and calculating the range line DA for the domain $[EC(\phi_{M-1}): EC(\phi_1)]$ from the radar to a point A vertically below the point C along the azimuth angle $\theta$ by solving equation $$\frac{1}{17000}(DA)^2\cos^2(\phi_{m-1}) + (DA)\sin(\phi_{m-1}) = H - (AC);$$

and
using the computer processor for calculating, in an interval $EC(\phi_1)<EC<EC(\phi_0)$, a weight BC using weight $BC=CD\times\sin(\phi_1-\phi)/(\cos(\phi_1\beta))$, and calculating the range DB for the domain $[EC(\phi_1): EC(\phi_0)]$ by solving equation $$\frac{1}{17000}(DB)^2\cos^2(\phi_1) + (DB)\sin(\phi_1) = H + (BC).$$

12. The process of claim 11 further comprising using the computer processor for generating a second technique containing the range line DA indexed by arc length EC for the domain $[0: EC(\phi_{M-1})]$.

13. The process of claim 12 further comprising using the computer processor for generating a third technique of weights BC and AC indexed by arc length EC for the domain $[EC(\phi_{M-1}):EC(\phi_1)]$.

14. The process of claim 13 wherein the first, second and third techniques are selected from a group including an algorithm, a chart, a table, a graph, and an equation.

15. The process of claim 12 further comprising using the computer processor for storing in the second technique, for the domain $[EC(\phi_{M-1}):EC(\phi_1)]$, the range DB and the range line DA indexed by arc length EC.

16. The process of claim 12 further comprising using the computer processor for storing in the second technique, for the domain $[EC(\phi_1):EC(\phi_0)]$, the range DB indexed by arc length EC.

17. The process of claim 11 further comprising:
using the computer processor for retrieving radar data $Z_A$ for the domain $[0: EC(\phi_{M-1})]$ at the range line DA from a radar volume scan data at the elevation angle $\phi_{M-1}$ and setting radar data $Z_C$ to radar data $Z_A$;
using the computer processor for retrieving radar data $Z_A$ and $Z_B$ at the range lines DA and DB, respectively, for the domain $[EC(\phi_{M-1}): EC(\phi_1)]$, from the radar volume scan data at two elevation angles $\phi$ adjacent to the point C, and calculating CAPPI data $Z_C$ at the point C using equation $$Z_C = \frac{((BC \times Z_A) + (AC \times Z_B))}{(BC+AC)};$$

and
using the computer processor for retrieving radar data ($Z_B$) at the range DB, for the domain $[EC(\phi_1): EC(\phi_0)]$, from the radar volume scan data at the elevation angle $\phi_1$ and setting radar data $Z_C$ to radar data $Z_B$ for the domain $[EC(\phi_1): EC(\phi_0)]$.

18. The process of claim 17 further comprising:
using the computer processor for setting arc length EC to a minimum distance $EC_{min}$;
using the computer processor for setting the increment associated with the arc length EC, $\Delta EC$, to 1 km;
using the computer processor for setting an azimuth angle increment $\Delta\theta$ to 1°;
using the computer processor for setting azimuth angle $\theta$ to a starting azimuth angle $\theta_{min}$; and
using the computer processor for querying whether $\theta \geq$ an ending azimuth angle $\theta_{max}$.

19. The process of claim 18 wherein if $\theta<\theta_{max}$, then CAPPI data at point C is generated at the azimuth angle $\theta$, and the azimuth angle $\theta$ is set to $\theta+\Delta\theta$.

20. The process of claim 18 wherein if $\theta \geq \theta_{max}$, and the arc length EC<BC (0°), then the azimuth angle $\theta$ is reset to the starting azimuth angle $\theta_{min}$, and the arc length EC is set to $EC+\Delta EC$.

21. The process of claim 17 further comprising using the computer processor for displaying the CAPPI data generated at the altitude in a PPI display.

22. The process of claim 21 wherein the PPI display supports an application selected from a group including rotation, zooming, magnification, distance interval, and sector selection.

23. The process of claim 11 wherein the process includes a group selected from a graph, a chart, a table, an algorithm and a set of equations.

24. The process of claim 11 wherein the process uses a processor using radar volume scan data obtained from a group selected from data obtained in real-time and data retrieved from storage.

25. The process of claim 11 wherein each of the range lines DB and DA include curves representing bent propagation paths between the radar and the points B and A, respectively.

26. A system to display weather radar data in a Constant Altitude Plan Position Indicator (CAPPI) system comprising:
means for processing radar volume scan data along an azimuth angle of a radar;
means for interpolating the radar volume scan data taken from adjacent elevation angles along the azimuth angle of the radar and in a local vertical direction that is orthogonal to a CAPPI surface to obtain CAPPI data corresponding to a predetermined altitude along the azimuth angle;
means for performing the above two steps for the azimuth angles within a specified range; and
means for displaying the CAPPI data obtained corresponding to the predetermined altitude.

27. The system of claim 26 further comprising means for generating CAPPI data from repeatedly performed similar radar volume scans by the radar.

* * * * *